Oct. 23, 1962
C. P. CLARE
3,060,291
SWITCHING ASSEMBLY
Filed Feb. 1, 1960
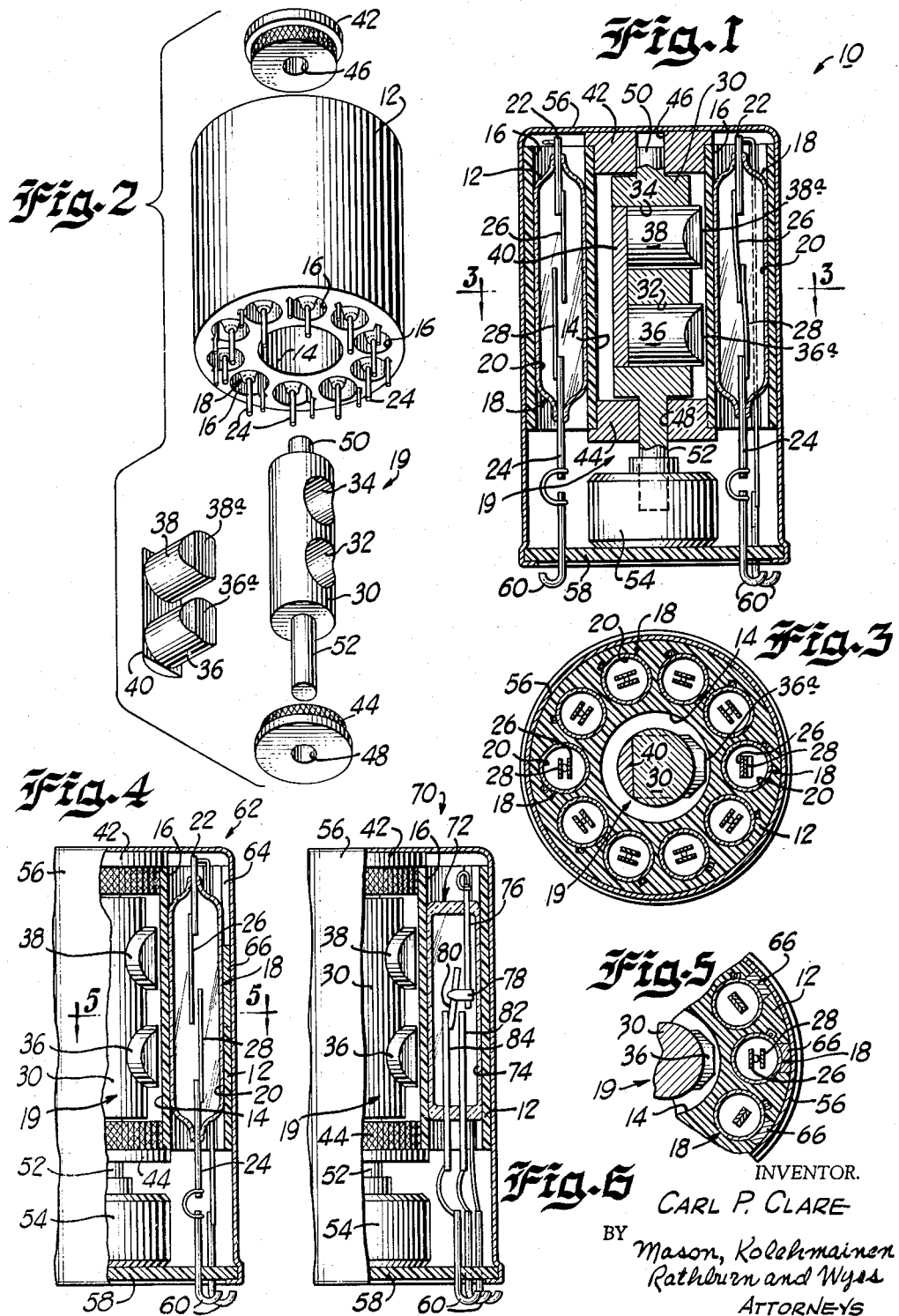
INVENTOR.
CARL P. CLARE
BY Mason, Kolehmainen, Rathburn and Wyss
ATTORNEYS

United States Patent Office 3,060,291
Patented Oct. 23, 1962

3,060,291
SWITCHING ASSEMBLY
Carl P. Clare, Arlington Heights, Ill., assignor to C. P.
Clare & Company, Chicago, Ill., a corporation of Delaware
Filed Feb. 1, 1960, Ser. No. 5,824
3 Claims. (Cl. 200—87)

This invention relates to a switching assembly and, more particularly, to a switching assembly in which a plurality of sealed switch units are sequentially operated by permanent magnetic means.

In many circuit applications, it is desirable to close or open a plurality of contact points in sequence so as, for instance, to perform various types of commutating or programming operations. These operations can be performed by conventional relay chains and stepping switches, although these types of switching mechanisms are somewhat heavy, require excessive installation space, and frequently present problems in operation due to power consumption, excessive contact resistance and relatively slow response time. In an attempt to overcome these deficiencies, various types of modified rotary switch constructions have been proposed. As an example, United States Patents Nos. 2,310,138 and 2,470,860 disclose rotary switches in which permanent magnetic means are moved relative to a circular array of separate switches each including a soft iron strip that is attracted by the permanent magnet to actuate separate contact elements. However, these arrangements do not provide an adequate solution to the problems of size, contact life and resistance, and speed of response.

Accordingly, one object of the present invention is to provide a new and improved switching assembly.

Another object is to provide a switching assembly in which a plurality of sealed switch units are actuated in sequence by moving permanent magnetic means.

A further object is to provide a relay construction in which sealed switch units including spaced and movable magnetic contact elements are operated in sequence by a permanent magnet which is rotatable about an axis parallel to the magnetic elements and which include separate pole means moving adjacent each of the spaced magnetic elements.

In accordance with these and many other objects, an embodiment of the invention comprises a housing defining both a plurality of circularly arranged and axially extending openings each adapted to receive a sealed switch unit and a centrally disposed opening adapted to receive permanent magnetic means for sequentially actuating the sealed switch units. Each of the sealed switch units comprises a dielectric envelope or housing containing at least two magnetic contact elements spaced from each other and extending generally parallel to the axis of the central opening. The magnetic elements include overlapping portions that are movable into and out of engagement in response to an applied magnetic field to provide open and closed circuit conditions.

The magnetic field is sequentially applied to each of these sealed switch units by the permanent magnetic means that is rotatably mounted in the central opening by a pair of bushings inserted into opposite ends of the central opening. The permanent magnetic means comprises a nonmagnetic armature or carrier which is rotatably mounted on the bearings and which includes two axially spaced openings extending transverse to the axis of the central opening. A pair of permanent magnets are positioned in the two openings in the carrier with their outer ends disposed adjacent the sealed switch units. The other ends of the permanent magnets are bridged by a magnetic member so that the two outer ends provide pole faces of opposite polarity for generating a flux field that extends generally parallel to the magnetic elements in the sealed switch units. The permanent magnets are so positioned that one of the pole faces moves in a circular path adjacent one of the magnetic elements and the pole face of the other permanent magnet moves in a circular path adjacent the others of the magnetic elements in the sealed switch units. Suitable drive means are secured to the carrier so that when the permanent magnetic means is rotated within the central opening, the flux field provided by the pair of permanent magnets sequentially links the two magnetic elements in the sealed switch units to actuate these units to open or closed circuit conditions.

In one embodiment, the magnetic elements are normally spaced from each other so that the flux field provided by the permanent magnetic means sequentially moves the magnetic elements in the sealed switch units into engagement in sequence. In another embodiment of the invention, a permanent magnet is disposed adjacent the magnetic elements in each of the sealed switch units so that these elements are normally held in engagement. Thus, when the permanent magnetic means which provides an oppositely directed flux field to that provided by the biasing magnets is rotated, the magnetic elements in the sealed switch units are sequentially moved out of engagement by their resilience. In a third embodiment of the invention, each of the sealed switch units includes one magnetic element that is normally biased into engagement with a contact element that is formed at least in part of nonmagnetic material. When the permanent magnetic means is rotated, the flux field provided by the permanent magnet moves the one magnetic element out of engagement with the nonmagnetic contact element and into engagement with the second magnetic element so as to provide a make and break contact arrangement in each of the sealed switch units.

Many other objects of the present invention will become apparent from considering the following detailed description thereof in conjunction with the drawings in which:

FIG. 1 is a sectional view of a switching assembly forming a first embodiment of the invention;

FIG. 2 is an exploded perspective view of a portion of the switching assembly shown in FIG. 1;

FIG. 3 is a sectional view taken along line 3—3 in FIG. 1 assuming that the complete switching assembly is shown therein;

FIG. 4 is a fragmentary sectional view of a switching assembly forming a second embodiment of the invention;

FIG. 5 is a fragmentary sectional view taken along line 5—5 in FIG. 4; and

FIG. 6 is a fragmentary sectional view of a switching assembly forming a third embodiment of the invention.

Referring now more specifically to FIGS. 1–3 of the drawings, therein is shown a switching assembly indicated generally as 10 which embodies the present invention and which includes a nonmagnetic housing or supporting element 12 defining a centrally disposed opening 14 and a plurality of circularly arranged and peripherally spaced openings 16. A sealed switch unit 18 is mounted in each of the openings 16, and an operating assembly 19 comprising a permanent magnetic means is mounted in the central opening 14 to provide a means for actuating each of the sealed switch units 18 in sequence. Each of the sealed switch units 18 includes magnetic contact elements that are movable into and out of engagement in response to an applied magnetic field, and the operator assembly 19 includes permanent magnetic means for generating a flux field generally parallel to the magnetic elements in the sealed switch units 18 so that rotation of the operator assembly 19 moves the flux field into a linking relation with each of the sealed switch units 18 in sequence so that these units are operated in succession.

Referring now more specifically to the sealed switch units, these switch units can be of any of the types well known in the art such as those shown and described in detail in Ellwood Patent No. 2,289,830. Each of the units 18 comprises an elongated dielectric or glass housing or envelope 20 in which a pair of magnetic terminals 22 and 24 are sealed. The terminals 22 and 24 support a pair of flexible magnetic contact elements or reeds 26 and 28, respectively, which are spaced from each other and which extend generally parallel to the axis of rotation of the operator assembly 19. The overlapping ends of the magnetic elements 26 and 28 are normally spaced from each other and are moved into engagement by an applied magnetic field to complete a conductive circuit between the terminals 22 and 24.

The operator assembly 19 comprises a nonmagnetic carrier or armature 30 defining a pair of axially spaced and transversely extending openings 32 and 34. A pair of permanent magnets 36 and 38 are mounted in the openings 32 and 34, respectively, and are provided with tapered end portions 36a and 38a forming pole faces of opposite polarities that are positioned adjacent the sealed switch units 18. The tapered configuration of the pole faces 36a and 38a tends to focus the flux in a narrow field substantially encompassing the width of only a single one of the sealed switch units 18 and extending generally parallel to the magnetic reeds or elements 26 and 28 therein. The opposite ends of the magnets 36 and 38 are bridged by a magnetic element 40 that is carried in a recess in the armature 30 at a position spaced inwardly toward the axis of the central opening 14 from the sealed switch units 18.

The carrier 30 is mounted for rotation about the axis of the central opening 14 by a pair of bearing elements 42 and 44 which are inserted into the upper and lower ends of the central opening 14 and which are provided with centrally disposed openings 46 and 48, respectively. The opening 46 rotatably receives an upper trunnion 50 on the carrier 30, and the lower opening 48 rotatably receives a shaft 52 that depends from the carrier 30. Suitable drive means 54 are secured to the lower end of the shaft 52 to provide means for rotating the carrier or armature 30 within the central opening 14. The drive means 54 can comprise any of the rotary drive means well known in the art so that the carrier 30 can be moved either continuously or step-by-step.

The operator assembly 19 and the sealed switch unit 18 can be inserted into a protective cover or housing 56 having an open lower end that is closed by a header plate 58 carrying a plurality of terminals or connectors 60. The terminal pins 22 and 24 of the sealed switch units 18 are connected to the terminals 60, and suitable connections to the drive means 54 can also be made by the terminals 60.

In the normal condition of the switching assembly 10, the magnetic elements or reeds 26 and 28 are in the position shown to the left in FIG. 1 in which the overlapping portions thereof are out of engagement. When the drive means 54 is actuated to rotate the operator assembly 19, the pole faces 36a and 38a are moved into alignment with the magnetic elements 26 and 28 in a particular one of the sealed switch units 18, such as the one shown to the right in FIGS. 1 and 3. At this time, the flux field extending between the two pole faces links the magnetic elements 26 and 28 and moves or deflects both of these elements or reeds into engagement so as to complete a conductive circuit between the related terminal pins 22 and 24 and the external circuits connected thereto by the terminals 60. As the drive means 54 moves the operator assembly 19 to its next peripherally spaced position, the movement of the flux field away from the actuated switch unit 18 permits the resiliency of the engaged magnetic elements 26 and 28 to replace these elements to the spaced position shown to the left in FIG. 1 and moves the magnetic elements 26 and 28 in the next switch unit 18 into engagement. In this manner, each of the sealed switch units 18 in the assembly 10 is operated to a closed circuit condition during each cycle of rotation of the operator assembly 19 therein.

FIGS. 4 and 5 of the drawings illustrate a second switching assembly indicated generally as 62 in which each of the sealed switch units 18 is operated from a closed circuit condition to an open circuit condition in response to a cycle of rotation of the operator assembly 19. The switching assembly 62 is identical to the switching assembly 10 except that the outer wall of the supporting member 12 is provided with a notch or recess 64 immediately adjacent each of the sealed switch units 18 for receiving a permanent magnet 66. This permanent magnet provides a flux field of a particular magnetic orientation that holds the overlapping portions of the magnetic elements 26 and 28 in engagement so that a conductive circuit is normally completed between the terminal pins 22 and 24 of each of the sealed switch units 18.

When the drive means 54 in the switching assembly 62 is rendered effective to rotate the operator assembly 19, the movement of the pole faces 36a and 38a on the permanent magnets 36 and 38 into alignment with a particular sealed switch unit 18 is effective to operate this switch unit to an open circuit condition. More specifically, the magnetic orientation of the flux field provided by the permanent magnets 36 and 38 is opposite to that of the magnetic field provided by the permanent magnets 66. In addition, the magnitude of the field provided by the permanent magnets 36 and 38 is of a sufficient magnitude to overcome the effect of the field of the permanent magnet 66 so that the resiliency of the magnetic elements 26 and 28 permits these two elements to separate to the position shown to the right in FIGS. 4 and 5. This opens the conductive circuit through the elements 26 and 28 of the actuated switch unit 18.

When the drive means 54 moves the operator assembly 19 to a position aligned with the adjacent switch unit 18, the permanent magnet 66 is again effective to move the overlapping portions of the previously separated magnetic elements 26 and 28 into engagement, and the assembly 19 separates the elements 26 and 28 in the unit 18 now aligned with the pole faces 36a and 38a. Thus, by the use of the permanent biasing magnets 66 adjacent the sealed switch units 18, the switching assembly 62 provides means for interrupting normally closed circuits in sequence in response to rotation of the operator assembly 19.

FIG. 6 of the drawings illustrates a third embodiment of the invention which comprises a switching assembly 70 that is identical to the switching assembly 10 with the exception that the sealed switch units 18 are replaced by a different type of sealed switch unit 72. The units 72 can be of the type shown and described in detail in the copending application of Wilhelm Juptner, Serial No. 678,236, filed August 14, 1957, which application is assigned to the same assignee as the present invention. As set forth in detail therein, each of the sealed switch units 72 comprises a glass or dielectric envelope or housing 74 having a magnetic terminal pin 76 projecting from one end thereof. The terminal pin 76 carries a pivot defining structure 78 of magnetic material for pivotally supporting a magnetic armature 80. Suitable means are provided for normally biasing the lower end of the armature 80 into engagement with a contact element or terminal 82 that is formed at least partially of nonmagnetic material. Thus, the terminals 76 and 82 are normally electrically connected by the movable armature 80. When a magnetic field is applied to the sealed switch unit 72, this flux field passes through the terminal pin 76, the pivot defining structure 78, the armature 80, and a magnetic contact element or terminal 84 that is spaced from and extends generally parallel to the nonmagnetic terminal 82. This flux field pivots the armature 80 out of engagement with the nonmagnetic contact element 82 and into engagement with the magnetic contact element 84 so that a conductive circuit is now completed between the terminals or contact elements 76 and 84.

When the switching assembly 70 is placed in operation, the drive means 54 moves the pole pieces 36a and 38a of the permanent magnets 36 and 38 into alignment with a particular one of the sealed switch units 72. The axially directed flux field extending between the permanent magnets 36 and 38 passes along the magnetic terminal pin 76, the pivot defining structure 78, the magnetic armature 80 and the magnetic element 84 to pivot the armature 80 against the action of the biasing means out of engagement with the nonmagnetic contact element 82 and into engagement with the magnetic contact element 84. Thus, the common terminal pin 76 is disconnected from the contact element 82 and is connected to the contact element 84. When continuing operation of the drive means 54 moves the operator assembly 19 away from the position illustrated in FIG. 6 and into alignment with the adjacent one of the sealed switch units 72, the biasing means restores the armature 80 to its normal position in which the lower end of the armature engages the nonmagnetic contact element 82. This interrupts the connection between the contact element 76 and the contact element 84 and reestablishes the connection between the elements 76 and 82.

Although the present invention has been described with reference to three illustrative embodiments thereof, it should be understood that numerous other modifications and embodiments can be made by those skilled in the art which will fall within the spirit and scope of the principles of this invention.

What is claimed and desired to be secured by Letters Patent of the United States is:

1. A relay construction comprising a housing defining an axially extending opening, a plurality of sealed switch units carried on said housing substantially equally spaced from the axis of said opening, each of said switch units including a sealed envelope containing a pair of longitudinally spaced magnetic contact elements extending generally parallel to said axis and having overlapping portions movable into and out of engagement in response to an applied magnetic field, a pair of permanent magnets extending transverse to and intersected by said axis, carrier means for mounting said magnets in a spaced parallel relation with one of said permanent magnets disposed at one side of the overlapping portions of said magnetic contact elements and with the other of said permanent magnets disposed at the other side of the overlapping portions of said magnetic contact elements, magnetic means extending generally parallel to said axis for magnetically connecting one end of said permanent magnets, the other ends of said permanent magnets being disposed immediately adjacent the sealed switch units and providing a magnetic field that extends generally parallel to said axis to pass through the overlapping portions of said magnetic contact elements, said magnetic means being disposed on the opposite side of said axis from said other ends of said permanent magnets, and means for moving said carrier means about said axis so that said magnetic field selectively operates said sealed switch units.

2. The relay construction set forth in claim 1 in which said magnetic means comprises a magnetic plate extending generally parallel to said axis and positioned closer to said axis than said other ends of the permanent magnets.

3. A switching assembly comprising a generally annular elongated housing defining a central opening and a plurality of peripherally spaced and axially extending openings, a plurality of sealed switch units each disposed in one of said openings, each of said sealed switch units including a dielectric envelope having magnetic contact elements at its opposite ends and extending generally parallel to the axis of said central opening, said magnetic contact elements having inner overlapping end portions that are movable into and out of engagement by an applied magnetic field, a pair of bearing members mounted in the opposite ends of said central opening, carrier means disposed in said central opening and rotatably mounted on said bearing members, said carrier means defining a pair of transverse openings extending generally transverse to and intersecting the axis of said central opening, said transverse openings being spaced along the axis of said central opening from each other so that one of these openings is disposed at one side of the overlapping portions of said magnetic contact elements and the other of these openings is disposed at the other side of the overlapping portions, a generally U-shaped permanent magnetic means mounted on said carrier means with the leg portions of said permanent magnetic means disposed in said transverse openings with their ends positioned immediately adjacent the sealed switch units at one side of the axis of said central opening and with the bight portion of said permanent magnetic means disposed on the opposite side of the axis of said central opening, said permanent magnetic means providing a magnetic field extending through the overlapping portion of said sealed switch units in a direction generally parallel to the axis of the central opening, and means for moving said carrier means to operate selected ones of said sealed switch units.

References Cited in the file of this patent

UNITED STATES PATENTS

| 2,872,597 | Ormond | Feb. 3, 1959 |
| 2,892,051 | Moore | June 23, 1959 |
| 2,922,994 | Kennedy | Jan. 26, 1960 |
| 2,929,896 | Ronning | Mar. 22, 1960 |
| 2,932,699 | Reese | Apr. 12, 1960 |
| 2,932,703 | Haberland | Apr. 12, 1960 |
| 2,945,931 | Reese | July 19, 1960 |

FOREIGN PATENTS

| 346,859 | Great Britain | Apr. 23, 1931 |